United States Patent [19]

Nohara et al.

[11] Patent Number: 4,649,004

[45] Date of Patent: Mar. 10, 1987

[54] PROCESS FOR PRODUCTION OF MULTI-LAYER PIPES FOR DRAW-FORMING

[75] Inventors: Shigezo Nohara; Takeshi Sugimoto, both of Yokohama; Kozaburo Sakano, Kawasaki; Yoshimichi Ohkubo, Fujisawa; Junichi Matsuo, Yokohama, all of Japan

[73] Assignee: Toyo Seikan Kaisha, Ltd., Tokyo, Japan

[21] Appl. No.: 686,507

[22] Filed: Dec. 26, 1984

[30] Foreign Application Priority Data

Dec. 27, 1983 [JP] Japan .................................. 58-244647
Jan. 12, 1984 [JP] Japan .................................... 59-2707

[51] Int. Cl.⁴ ............................................. B29C 47/88
[52] U.S. Cl. ........................................ 264/85; 264/173; 264/514; 264/515
[58] Field of Search .................. 264/85, 514, 515, 173

[56] References Cited

U.S. PATENT DOCUMENTS

| | | | |
|---|---|---|---|
| 4,002,709 | 1/1977 | Mozer | 264/532 |
| 4,088,724 | 5/1978 | Kuhnert | 264/85 |
| 4,436,778 | 3/1984 | Dugal | 264/515 X |

OTHER PUBLICATIONS

U.S. Def. Publ. T978,005, P. L. Funck, 1/1979.

Primary Examiner—Jan Silbaugh
Assistant Examiner—Jennifer Cabaniss
Attorney, Agent, or Firm—Sughrue, Mion, Zinn, Macpeak & Seas

[57] ABSTRACT

A process for the production of a multi-layer pipe to be used for formation of a bottle by drawblow-forming, comprising forming by co-extrusion a pipe having inner and outer layers of a polyester composed mainly of ethylene terephthalate units and an intermediate layer of an oxygen-barrier resin interposed between the inner and outer layers. An adhesive resin layer is preferable interposed between every two adjacent layers. The co-extruded multi-layer pipe is sized in the molten state so that the diameter of the pipe is uniform. The process continues by cooling the outer portion of the molten multi-layer pipe by contact with water and simultaneously introducing an inert gas or an inert gas containing a water mist into the interior of the pipe to thereby cool the inner portion of the pipe and prevent oxidation in the pipe. A multi-layer pipe prepared according to this process is excellent in the transparency and the draw-formability into a multi-layer drawn bottle.

7 Claims, 8 Drawing Figures

PROCESS FOR PRODUCTION OF MULTI-LAYER PIPES FOR DRAW-FORMING

BACKGROUND OF THE INVENTION (1) Field of the Invention

The present invention relates to a process for the production of multi-layer pipes for draw-forming. More particularly, the present invention relates to a process in which a multi-layer pipe to be used for the production of a draw-blow-formed bottle comprising a polyester layer and an oxygen-barrier resin layer is prepared in the transparent state while preventing crystallization.

(2) Description of the Prior Art

A process for preparing bottles by pre-heating a preform of a polyester composed mainly of ethylene terephthalate units to a drawing temperature of, for example, 85° to 110° C. and biaxially drawing the heated preform in the axial direction and the circumferential direction has been broadly adopted in the art.

In preparing a preform to be used for draw-forming, it is important that a resin molded in a molten state should be rapidly cooled to a super-cooled state to inhibit crystallization, for if crystallization is caused in the preform, the draw-formability is reduced and a final bottle becames opaque.

Draw-blow-formed polyester bottles prepared according to the above-mentioned process have been broadly used as packaging vessels for carbonated drinks, beer, whiskey, soy sauce, other sauces and detergents because they have such preferred characteristics as high toughness, light weight, high transparency, high pressure resistance and act as a good gas barrier. However, even polyester bottles which are regarded as being excellent in the gas barrier property among plastic vessels, are considerably inferior to metal cans or glass bottles as gar barrier vessels for storing and maintaining carbonated drinks or fruit juice drinks. Namely, although a metal can wall or a glass bottle wall has a gas permeability of zero, a polyester allows certain permeation of a gas such as oxygen gas or carbon dioxide gas even if the polyester is excellent in the gas barrier property. Namely, although drawn polyester bottles recently developed have excellent characteristics not possessed by other materials, such as high transparency, light weight, high toughness and high pressure resistance, they cannot be regarded as being completely satisfacrtrory in the gas barrier property. Accordingly, the shelf life of a drawn polyester bottle filled with a carbonated drink, beer or fruit juice is somewhat limited or the use of a drawn polyester bottle is limited to a large-size vessel which is placed under a mild storage condition. Therefore, drawn polyester bottles are not satisfactory as vessels for circulation of bottled goods.

Under this background, improvement of the gas barrier property of a polyester vessel is inevitably desired, and since a vessel composed of a single layer of a polyester is not satisfactory, it is desired to impart a higher gas barrier property by a better method.

As the method for improving the gas barrier property in a vessel composed of a single layer of a polyester, there are considered, for example, a method in which the surface of a polyester vessel is covered with an aluminum foil or glass foil having no gas permeability, a method in which the inner and outer surfaces of a polyester vessel are coated with a gas-barrier resin lacquer, and a method in which in preparing a preform or pipe for draw-forming, a multi-layer structure is formed by co-injection (inclusive of multi-staged injection) or co-extrusion using a gas barrier thermoplastic resin.

Of multi-layer structure-forming methods, the coating or covering method is defective in that peculiar troublesome operations are necessary in addition to the bottle-forming operation, and the method for forming a multi-layer preform by multi-staged injection is troublesome and defective in that molds should be exchanged according to the kinds of resins and injection should be carried out in multiple stages. In contrast, the co-extrusion method for preparing a pipe for draw-forming is advantageous in that it is sufficient if a plurality of molten resin streams are joined together in a die and hence, the operation is very easy.

As pointed out hereinbefore, a multi-layer drawn polyester bottle is advantageous in that the formed bottle is transparent. Accordingly, it is important that the starting multi-layer polyester pipe should also be transparent.

Formation of transparent multi-layer polyester pipes, however, involves several difficulties. In case of extrusion molding of a pipe composed of a single layer of a polyester, a considerably transparent pipe can be easily obtained, though the thickness is limited to some extent. However, in case of a multi-layer polyester pipe intended in the present invention, formation of a transparent pipe is not so easy. It has been found that the main cause is that a gas barrier resin such as an ethylene/vinyl alcohol copolymer, which is interposed as an intermediate layer, acts as a barrier to conduction of heat when a molten multi-layer polyester pipe is cooled.

More specifically, cooling of a pipe is performed by introducing an extrudate into water as in case of cooling of a film or sheet. In case of a pipe, even though the outer side of the pipe falls in contact with cooling water, since introduction of cooling water into the inner side of the pipe is difficult, the inner side of the pipe cannot but be effected by cooling of a low cooling efficiency such as heat conduction cooling from the outer side or cooling in the gas phase.

Especially in the case where an ethylene/vinyl alcohol copolymer is combined with a polyester in forming a multi-layer structure so as to improve the gas barrier property in a polyester bottle, there is adopted a method in which the ethylene/vinyl alcohol copolymer in which the gas barrier property is reduced by moisture is interposed as an intermediate layer and sandwiched with inner and outer layers of polyethylene terephthalate. Among various resins, the ethylene/vinyl alcohol copolymer has a lowest heat conductivity, and this copolymer acts as a barrier to conduction of heat. Therefore, it often happens that the inner polyester layer located on the inner side of the pipe is hardly cooled, with the result that crystallization is caused in the inner polyester layer and only a pipe having a hazy inner layer is obtained.

SUMMARY OF THE INVENTION

It is a primary object of the present invention to provide process for forming a multi-layer pipe for draw-forming in which the above-mentioned defects are eliminated.

Another object of the present invention is to provide a process for preparing a multi-layer pipe for draw-forming which comprises a polyester layer and a layer of a gas barrier resin such as an ethylene/vinyl alcohol copolymer while preventing crystallization (whitening) of the polyester.

Still another object of the present invention is to provide a process for preparing a multi-layer pipe excellent in the draw-formability and the transparency.

We found that in forming a multi-layer pipe as mentioned above, if the outer portion of the pipe in the molten state is cooled with water and an inert gas or an inert gas containing a water mist is simultaneously introduced into the inner portion of the pipe, the transparency of the obtained pipe is highly improved.

It also was found that if the thickness ratio between the inner and outer polyester layers is adjusted within a specific range, crystallization or whitening can be prevented more effectively.

More specifically, in accordance with the present invention, there is provided a process for the production of a multi-layer pipe to be used for formation of a bottle by draw-blow-forming, which comprises forming by co-extrustion a pipe comprising inner and outer layers of a polyester composed mainly of ethylene terephthalate units and an intermediate layer of an oxygen-barrier resin interposed between the inner and outer layers, if necessary with an adhesive resin layer interposed between every two adjacent layers, sizing the co-extruded multi-layer pipe in the molten state so that the diameter of the pipe is uniform, and cooling the outer portion of the molten multi-layer pipe by contact with water and simultaneously introducing an inert gas or an inert gas containing a water mist into the interior of the pipe to thereby cool the inner portion of the pipe and prevent oxidation in the pipe.

Furthermore, in accordance with the present invention, there is provided a process as described above, which is further characterized in that the co-extrusion is carried out so that the thickness ratio of the inner polyester layer to the outer polyester layer is in the range of from 1/1.1 to 1/5.

Reference numerals in the drawings have the following meanings.

1: multi-ply die, 6: main extruder, 9 and 10: subextruders, 12: multi-layer pipe, 13: sizing former, 14: cooling tank, 16: cutter, 17: inert gas feed pipe, 18: water feed pipe, 21: pipe, 26: bottom portion, 27: end of opening, 30: preform, 36: multi-layer drawn bottle

DETAILED DESCRIPTION OF THE PREFERRED EMBODIMENTS

The present invention will now be described in detail with reference to the accompanying drawings.

Figure 1:
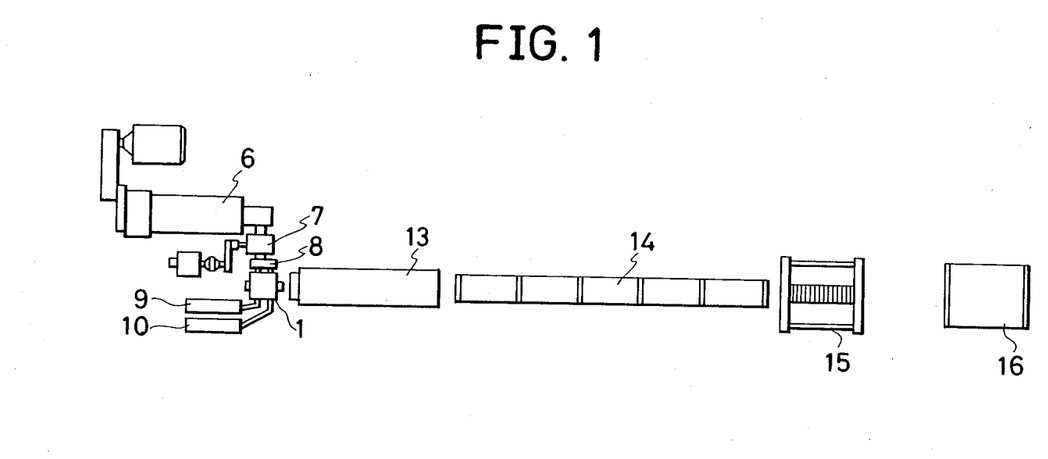
FIG. 1 is a plane view showing an apparatus for forming a multi-layer pipe.
Figure 2:
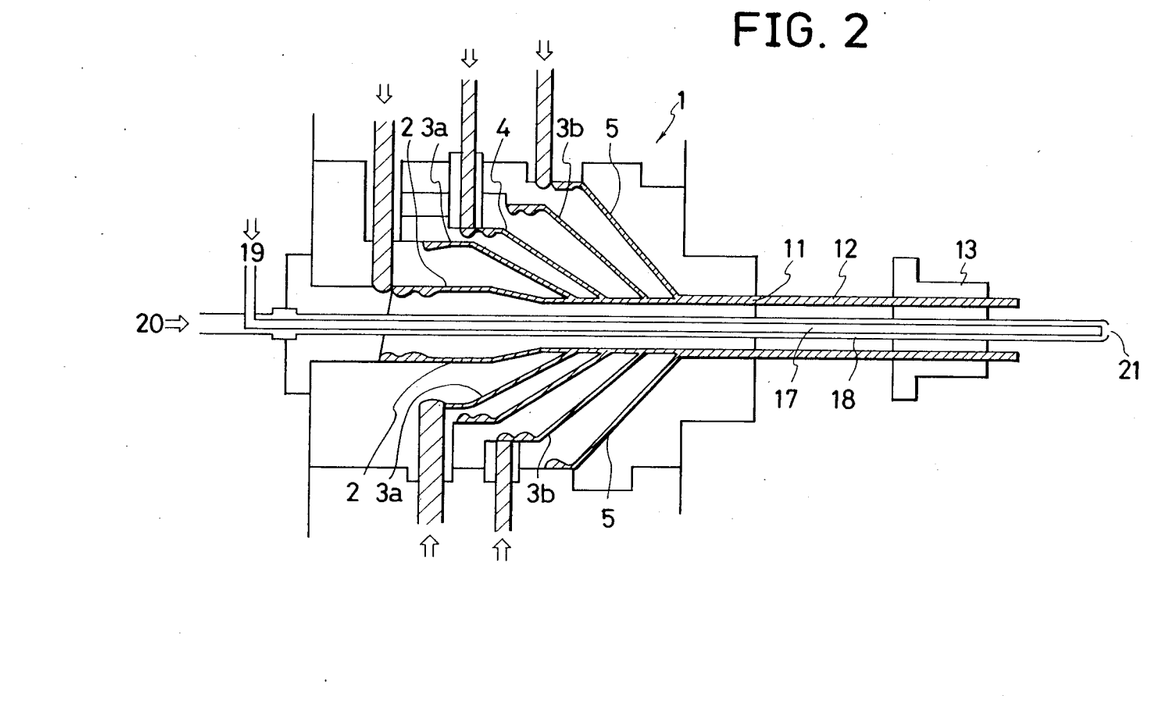
FIG. 2 is a sectional view showing a multi-ply die.

Referring to FIG. 1 illustrating the entire layout of a forming machine used in the process of the present invention and FIG. 2 showing in detail the structure of a die, in a multi-layer multi-ply die 1, there are arranged in order from the center to the outside a passage 2 for an inner layer of a polyester (PET) composed mainly of ethylene terephthalate units, a passage 3a for an adhesive, a passage 4 for a gas-barrier resin, a passage 3b for an adhesive and a passage 5 for an outer polyester layer. The passages 2 and 5 for inner and outer polyester layers are connected to a polyester extruder (main extruder) 6 through a gear pump 7 and a branching channel 8. The adhesive passages 3a and 3b are connected to an adhesive extruder (sub-extruder A) 9 provided with a gear pump, and the gas-barrier resin passage 4 is connected to a gas-barrier resin extruder (sub-extruder B) 10.

The resins supplied into the die from the respective resin passages are laminated in order of inner polyester layer/adhesive layer/gas-barrier resin intermediate layer/adhesive layer/polyester layer, and the laminated resins are extruded in the form of a multi-layer pipe 12 through a die orifice 11. The resin pipe 12 is introduced into a sizing former 13 where the diameter of the pipe 12 is adjusted to a predetermined size, and then, the pipe 12 is introduced in a cooling tank 14 in which cooling water is contained, where the molten pipe is cooled and solidified. The pipe is then taken up from the cooling tank by a take-up machine 15 and cut in a predetermined size by a cutter 16, whereby a pipe for formation of a preform is prepared.

In the present invention, an inert gas or an inert gas containing a water mist is positively introduced into the interior of the pipe being melt-extruded. Referring to FIG. 2, an inert gas feed pipe 17 and a water feed pipe 18 are extended through the die 1 along the center axis of the die 1. In an embodiment shown in FIG. 2, the pipe 17 is arranged coaxially with the pipe 18, and the pipe 17 having a small diameter forms an inert gas passage and an annular space between the pipe 17 and the pipe 18 having a large diameter forms a water passage. The pipes 17 and 18 are connected to a source 19 of an inert gas such as nitrogen and a water source 20, respectively, on the end opposite the die orifice 11. The diameter of the other end portion of the pipe 18 is reduced to form a nozzle 21. In the case where the water source is closed and an inert gas is fed into the pipe 17 from the inert gas source 19, the inert gas is filled in the resin pipe 12 from the nozzle 21, and simultaneously, the resin pipe 12 is cooled from the inner surface side by the inert gas. Similarly, in the case where water and the inert gas are simultaneously supplied from the water source 20 and the inert gas source 19, the inert gas containing a water mist is filled in the resin pipe 12 through the nozzle 21, and cooling of the resin pipe 12 from the inner surface side can be performed more efficiently.

As pointed out hereinbefore, in the production of a multi-layer extrusion pipe comprising inner and outer polyester layers and a gas-barrier resin intermediate layer, the outer polyester layer is promptly cooled to the super-cooled state by contact with cooling water and the transparency and drawability of this outer layer are highly improved. However, since the gas-barrier resin intermediate layer acts as a barrier layer to conduction of heat at the cooling step, the inner polyester layer is in a state where the inner layer is hardly cooled.

The temperature conductivities of various resins are shown in Table 1 given below.

TABLE 1

| Resin | Temperature Conductivity, $10^{-4}$ m²/hr |
| --- | --- |
| polypropylene | 2.50–3.00 |
| Polystyrene | 2.51–3.40 |
| Vinylidene chloride resin | 2.50–2.65 |
| EVOH | 2.00–2.55 |
| Undrawn PET | 6.40–7.80 |
| Drawn PET | 4.90–5.5 |

From the data shown in Table 1, it will readily be understood that among various resins, an ethylene/vinyl alcohol copolymer (EVOH) has a lowest heat conductivity, that is it corresponds to ½ to ⅓ of the heat conductivity of polyethylene terephthalate (PET). Namely, the ethylene/vinyl alcohol copolymer acts not only as a gas barrier but also as a barrier to conduction of heat.

As means for preventing the above-mentioned disadvantage, that is, scarce cooling of the inner polyester layer, there may be considered a method in which cold air is introduced to the inner surface of the multi-layer pipe. However, from the results of experiments made by us, it was found that the transparency cannot be improved only by introducing cold air to the interior of the multi-layer pipe or spraying water to the inner surface of the multi-layer pipe.

More specifically, we made comparative experiments of production of multi-layer pipes under the following conditions: (i) the inner surface of the pipe is not cooled, (ii) an air stream is passed through the interior of the pipe, (iii) a nitrogen stream is passed through the interior of the pipe, (iv) water is sprayed by air, and (v) water is sprayed by nitrogen. Of course, the cooling effect differs according to the external water cooling method, the pipe take-up speed, the thickness and the layer structure. Accordingly, these conditions are kept as uniform as possible at the foregoing experiments. Since evaluation of the transparency can be performed more easily on a draw-blown bottle than on a thick pipe, the transparency is evaluated based on bottles formed by draw-blowing. As described in the examples given hereinafter, the transparency is lowest in the case where the inner portion of the pipe is not positively cooled, and even in the case where an air stream is passed the transparency is hardly improved, while the transparency is prominently improved when a nitrogen stream is passed. Hereupon, it must be noted that if inclusion of air is not completely avoided in introduction of nitrogen gas, the effect attained by introduction of a nitrogen stream is drastically reduced.

As to the experiments where water is sprayed so as to enhance the internal cooling effect, if spraying is effected by air, a certain cooling effect is attained by spraying of water but the effect of maintaining the transparency is hardly attained by the presence of air. On the other hand, if spraying of water is effected by nitrogen gas from which air is excluded, the effect of maintaining the transparency is prominently enhanced.

The effect of the external water cooling is not questionable at all. If internal cooling is carried out by a gas, it may be considered that since the heat capacity of the gas is small, the cooling effect is much lower than the cooling effect by water. It is quite surprising that in connection with the maintenance of the transparency, there is a certain difference between air and nitrogen though each has a small heat capacity, and that when a water mist is incorporated, there is a prominent difference between air and nitrogen gas (see data shown in Table 2 given hereinafter). This difference of the maintenance of the transparency between air and nitrogen, supplied in the form of streams of the same capacity, cannot be explained only by the difference of the cooling effect. This difference may probably be due to the presence or absence of oxidation of the inner polyester layer. However, the difference of the transparency cannot sufficiently be explained only by the presence or absence of surface oxidation. Factors having influences on attainment of the effect of improving the transparency by a nitrogen gas stream, such as this surface oxidation of the inner layer and promotion of oxidation and crystallization by oxygen permeating into the high-temperature resin, should be further examined in the future.

In accordance with one embodiment of the present invention, the thicknesses of outer and inner polyethylene terephthalate layers insulated from each other by an intermediate layer of a gas-barrier resin such as an ethylene/vinyl alcohol copolymer are made larger and smaller, respectively, whereby attainment of an external cooling effect is expected in the outer layer and receipt of the internal cooling effect by the inner layer is made easier by reducing the thickness of the inner layer, and crystallization is inhibited in the production of a multi-layer pipe. This problem of crystallization of resins in the production of a pipe is a peculiar problem involved in the combination of inner and outer polyester layers and an intermediate layer of a gas-barrier resin such as an ethylene/vinyl alcohol copolymer. In this embodiment of the present invention, this problem is more effectively solved by adjusting the thickness ratio between the inner polyester layer and the outer polyester layer within a range of from 1/1.1 to 1/5, especially from ½ to ⅓.

According to this embodiment of the present invention, other various advantages can be attained by making the thickness of the inner polyester layer smaller than the thickness of the outer polyester layer. When a drink or the like is filled in a polyester bottle, there ordinary arises a problem of generation of a bad smell of acetaldehyde. In the polyester bottle of the present invention comprising an inner polyester layer having a reduced thickness, there can be attained an effect of reducing the acetaldehyde concentration in the content as compared with a bottle composed of a single layer of a polyester or a multi-layer polyester bottle comprising an inner layer having a large thickness.

In case of a carbonated drink, carbon dioxide gas is ordinarily lost through the wall of a polyester bottle, and moreover, loss of carbon dioxide gas by absorption (adsorption) of carbon dioxide gas by the polyester resin layer at the initial stage of filling is not neglected. In the multi-layer polyester bottle of the present invention comprising an inner layer having a reduced thickness, the loss of carbon dioxide gas by absorption is reduced with reduction of the thickness of the inner layer, and the quality of the carbonated drink evaluated based on the carbon dioxide gas content can be advantageously maintained at a high level.

In the present invention, as the polyester forming the inner and outer layers, there can be used, for example, polyethylene terephthalate and a copolyester being composed mainly of ethylene terephthalate units and containing minor amounts of other known modifying ester units. The molecular weight of the polyester is not particularly critical, so far as it has a film-forming molecular weight.

Known oxygen-barrier resins such as an ethylene/vinyl alcohol copolymer, a vinylidene chloride resin, a high-nitrile resin and a polyamide may be used as the gas-barrier resin of the intermediate layer. Among these resins, an ethylene/vinyl alcohol copolymer is especially preferred. A copolymer obtained by saponifying a copolymer of ethylene with a vinyl ester such as vinyl acetate is used as the ethylene/vinyl alcohol copolymer. In view of the adaptability to the forming operation and the gas barrier property, it is preferred that an ethylene/vinyl alcohol copolymer having an ethylene content of 15 to 50 mole %, especially 25 to 45 mole %, and a saponification degree of at least 96% be used. The molecular weight of the copolymer is not particularly critical, so far as it has a film-forming molecular weight.

A known adhesive may be used so as to improve the adhesiveness between the polyester layer and the ethylene/vinyl alcohol copolymer layer. For example, there can be used a copolyester type adhesive, a polyester-ether type adhesive, an epoxy-modified thermoplastic resin and an acid-modified thermoplastic resin.

Various lamination structures may be adopted for the polyester substrate (PET), the ethylene/vinyl alcohol copolymer layer (EVOH) and the adhesive layer (AD). For example, there may be adopted layer structures of PET/EVOH/PET and PET/AD/EVOH/AD/PET in which the outer layer is located on the left side and the inner layer is located on the right side.

The thicknesses of the layers may be broadly changed, but it is ordinarily preferred that the PET/EVOH thickness ratio be within a range of from 2/1 to 30/1, especially from 4/1 to 15/1. In the case where an adhesive layer is employed, it is preferred that the PET/AD thickness ratio be within a range of from 5/1 to 100/1, especially from 10/1 to 50/1.

Figure 3:
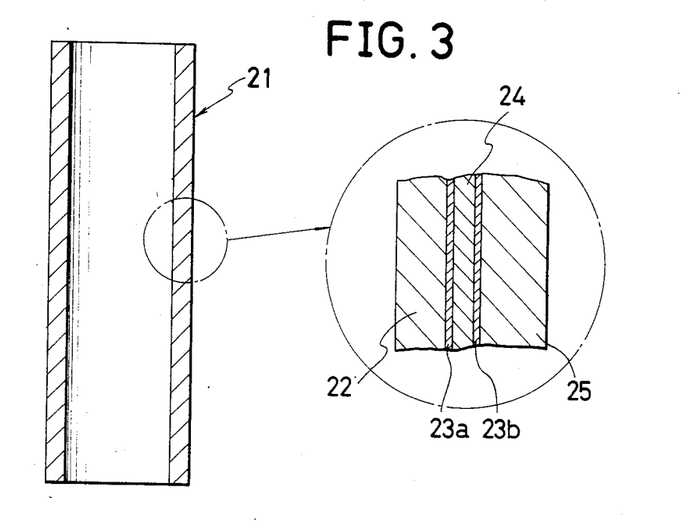
FIG. 3 is a sectional view showing a multi-layer pipe to be used in the present invention.

FIG. 3 shows a preferred multi-layer pipe prepared according to the process of the present invention. This multi-layer pipe 21 comprises inner and outer layers 22 and 25 of a polyester, an intermediate gas-barrier layer 24 of an ethylene/vinyl alcohol copolymer, and interposed adhesive layers 23a and 23b.

As pointed out hereinbefore, it is important that this pipe should be prepared by co-extrusion, and it also is important that the pipe should be rapidly cooled by immersion in water or the like and an inert gas should be passed into the interior of the pipe, whereby opacification of the polyester is prevented.

Figure 4:
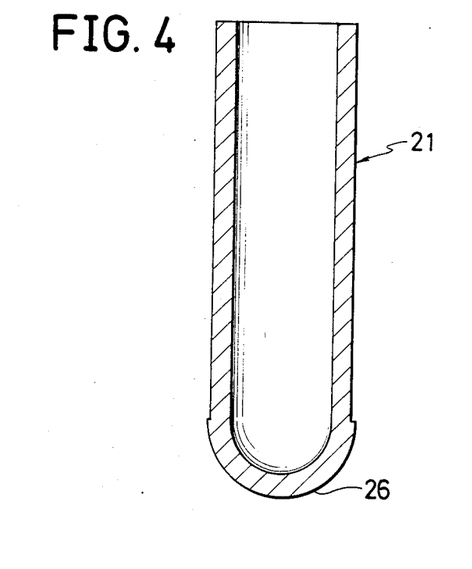
FIGS. 4 and 5 are sectional views showing a preform in which bottom and neck portions are formed.

This pipe is cut into a certain size, and one end is heated and fused and is pressed by female and male molds having a cavity corresponding to an optional bottom shape, such as a semi-spherical shape, and a projection, whereby a closed bottom portion 26 as shown in FIG. 4 is formed.

Figure 5:
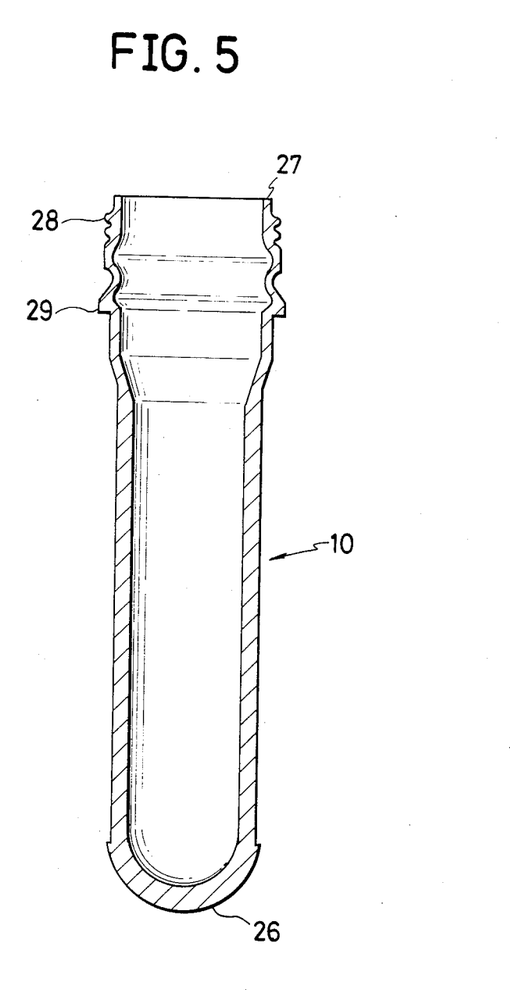

The other end of this pipe 21 is heated and pressing, drawing and blow forming are carried out in optional molds, whereby a preform 30 having an opening 27 on the top end and also having lid-fitting, screw and anchoring portions such as a screw 28 and a neck ring (support ring) 29 on the periphery as shown in FIG. 5 is formed.

The order of the operations in the above-mentioned preform-preparing process is not particularly critical, and the operations may be conducted in the above-mentioned order or in the reverse order, or the operations may be simultaneously conducted.

The above-mentioned preform-preparing process is characterized in that waste resin portions (scraps) are not formed in preparing a preform from the multi-layer pipe.

At the subsequent step, the multi-layer preform is preliminarily heated at a temperature suitable for drawing of the preform by hot air, an infrared ray heater or high frequency induction heating. Namely, the preform is heated at a polyester resin drawing temperature of 85° to 120° C., preferably 95° to 110° C.

Figure 6:
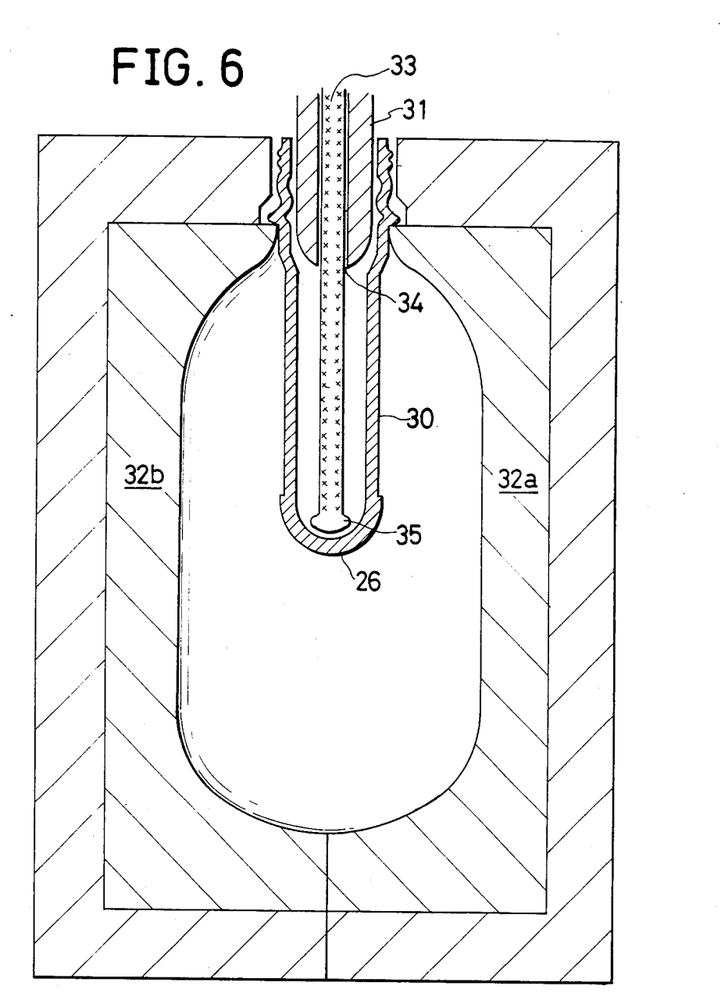
FIG. 6 is a sectional view showing a preform held in a blow mold before blow forming.
Figure 7:
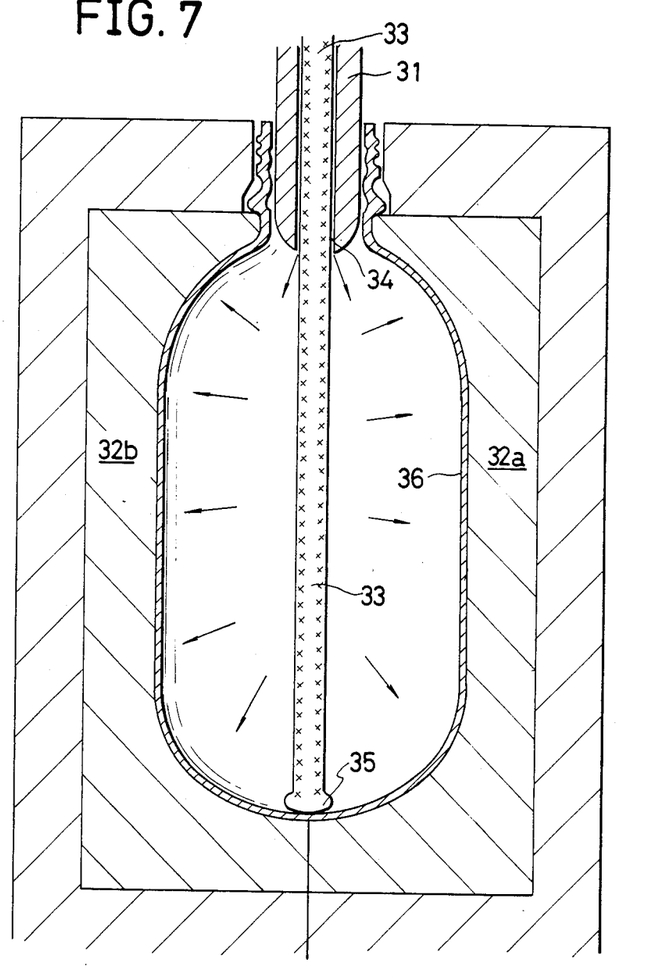
FIG. 7 is a sectional view showing this preform after blow forming.

Referring to FIGS. 6 and 7 illustrating the draw-blow forming operation, a mandrel 31 is inserted in the mouth portion of the preform 30 and the mouth portion is gripped by a pair of split molds 32a and 32b. A drawing rod 33 is arranged vertically movably coaxially with the mandrel 31, and a fluid-blowing annular passage 34 is formed between the drawing rod 33 and the mandrel 31.

The top end 35 of the drawing rod 33 is applied to the inner side of the bottom portion 26 of the preform 30, and the preform 30 is drawn in the axial direction by moving the drawing rod 33 downward and is expanded and drawn in the circumferential direction by the pressure of a fluid blown into the preform 30 through the above-mentioned passage 34.

By drawing the pipe prepared according to the present invention in the axial direction and the circumferential direction simultaneously or substantially simultaneously, even the layer of an ethylene/vinyl alcohol copolymer having a high vinyl alcohol content can be drawn at a relatively low temperature and a multi-layer vessel excellent in the transparency can be obtained.

This is quite surprising in view of the fact that drawing of an ethylene/vinyl alcohol copolymer having a high vinyl alcohol content is very difficult and even if a film of this copolymer is sequentially drawn first in the axial direction and then in the transverse direction at a temperature suitable for drawing, the film is broken in the midway of the drawing operation. Moreover, in view of the fact that in draw-blow forming of a multi-layer pipe of polypropylene and an ethylene/vinyl alcohol copolymer, the ethylene/vinyl alcohol copolymer layer can be drawn for the first time at such a considerably high temperature as 140° to 165° C., it is quite surprising that the ethylene/vinyl alcohol copolymer can be biaxially drawn at a polyester resindrawing temperature of 85° to 120° C., especially 95° to 110° C.

It is considered that the reason will probably be that co-drawing is carried out in the state where the ethylene/vinyl alcohol copolymer layer is placed on the polyester layer, the interlaminar peeling between the two resin layers is inhibited at the co-drawing step and the biaxial drawing is carried out simultaneously in a good balance.

Figure 8:
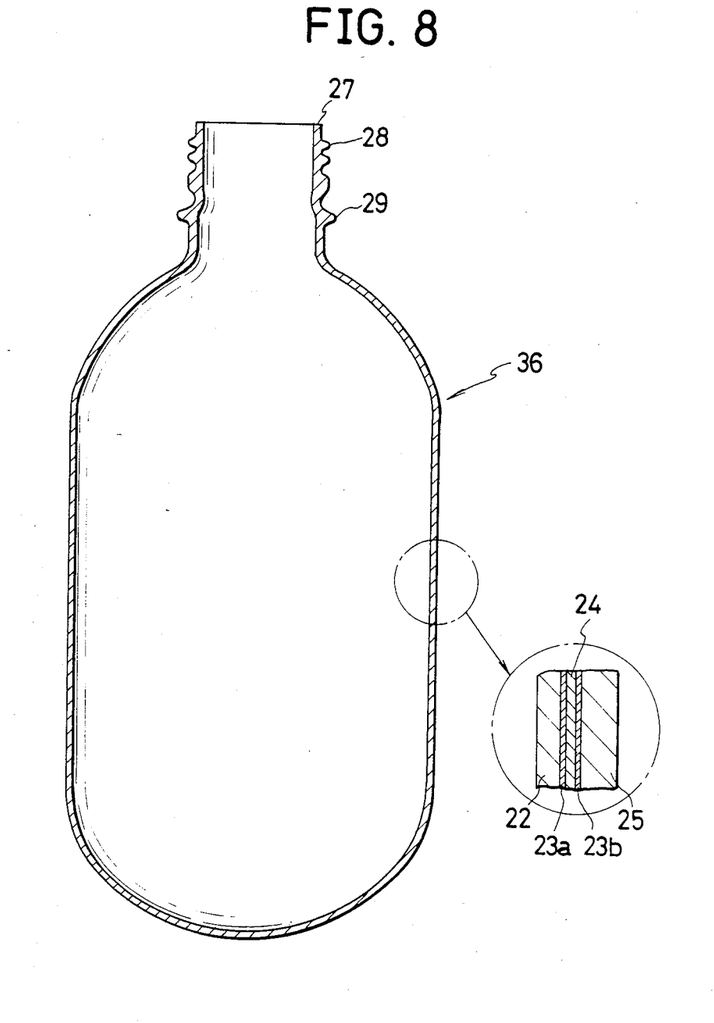
FIG. 8 is a sectional view showing a multi-layer drawn bottle formed according to the present invention.

The so-obtained multi-layer drawn polyester bottle 36 shown in FIG. 8 has an excellent transparency and has a gas barrier property much higher than that of a bottle composed solely of a polyester (drawn PET), which is excellent over other plastic bottles. Furthermore, this gas barrier property is freely adjustable, and the bottle has a good pressure resistance. Accordingly, this bottle is very suitable for filling and storage of carbonated drinks such as beer, cola and cider, and the bottle is excellent in the sanitary characteristics, and the used vessel can be easily treated by incineration because gases generated by incineration of the used vessel are composed substantially of carbon dioxide gas and water and no harmful gas is produced. In short, according to the present invention, there is provided an ideal vessel which is comparable to a glass bottle in the transparency, gas barrier property and pressure resistance and has a light weight and a high resistance to the bottle breakage.

The present invention will now be described in detail with reference to the following examples that by no means limit the scope of the invention.

was measured. The obtained results are shown in Table 2.

As is apparent from the results shown in Table 2, the bottle prepared according to the process of the present invention is excellent in the haze and diffusion transmission over the bottles prepared according to the conventional techniques.

TABLE 2

| Run No. | Internal Cooling Condition | Take-Up Speed (m/min) | Properties of Bottle | | |
|---|---|---|---|---|---|
| | | | Total Light Transmittance Tt (%) | Diffusion Transmission Td (%) | Haze (%) |
| 1 | no fluid | 3 | 86.2 | 43.5 | 50.4 |
| 2 | air, 4 m³/hr | 3 | 87.6 | 36.5 | 41.6 |
| 3* | nitrogen, 4 m³/hr | 3 | 88.1 | 7.9 | 9.0 |
| 4 | water sprayed, air, 4 m³/hr | 3 | 87.3 | 30.1 | 34.6 |
| 5* | water sprayed, nitrogen, 4 m³/hr | 3 | 87.6 | 4.0 | 4.6 |

Note
*present invention

EXAMPLE 1

By using a main extruder having a screw having a diameter of 90 mm installed therein and being provided with an accessory gear pump and two sub-extruders having a screw having a diameter of 40 mm installed therein (the extruder for the adhesive was provided with a gear pump), three extruders as a whole, resins were joined in the multi-annular form in a multi-ply die for forming a three-resin five-layer pipe and were extruded in the form of a molten pipe. The molten pipe was passed through a sizing former so as to determine the extrusion size and was introduced into a pipe forming machine where the pipe was passed through a cooling tank for cooling the outer surface by a jet water stream and a take-up machine, and the pipe was cut into a predetermined size by a cutter.

Polyethylene terephthalate (PET) having an intrinsic viscosity of 1.0, extruded from the main extruder, an ethylene/vinyl alcohol copolymer having an ethylene content of about 30 mole % (marketed under the tradename "EVAL"), extruded from the sub-extruder A, and an ester type adhesive (AD) extruded from the subextruder B were supplied to the multi-ply die through the gear pumps, and the resins were extruded at a PET (outer size)/AD/EVAL/AD/PET (inner side) thickness ratio of 100/5/15/5/40. While keeping the forming conditions constant, the forming test was carried out under the following five fluid-supplying conditions: (i) no fluid was introduced on the inner surface of the pipe (Run No. 1), (ii) an air stream was introduced at a rate of 4 m³/hr on the inner surface of the pipe (Run No. 2), (iii) a nitrogen stream was introduced at a rate of 4 m³/hr on the inner surface of the pipe (Run No. 3), (iv) water was sprayed at a rate of 1800 cc/hr on the inner surface of the pipe by air fed at a rate of 4 m³/hr (Run No. 4) and (v) water was sprayed at a rate of 1800 cc/hr on the inner surface of the pipe by nitrogen fed at a rate of 4 m³/hr (Run No. 5).

Each of the obtained pipes had an outer diameter of 30 mm, an inner diameter of 23 mm, a thickness of 3.7 mm and a weight of 59 g.

The lower end of each pipe was heated and fusion-closed in a semi-spherical shape, and the other end was heat-formed into a neck portion having a screw. The so-obtained preform was preliminarily heated at about 98° C. and was drawn in a blow mold in both the axial direction and the transverse direction substantially simultaneously to obtain a cylindrical bottle having an inner capacity of 1.5 l. A test piece was cut out from the barrel portion of the bottle and the light transmittance

EXAMPLE 2

A main extruder having a screw having a diameter of 90 mm installed therein and two sub-extruders having a screw having a diameter of 40 mm installed therein, three extruders as a whole, were connected to a die head for forming a three-resin five-layer pipe. Polyethylene terephthalate having an intrinsic viscosity (IV) of 1.0 was supplied to the main extruder for formation of inner and outer layers, an ethylene/vinyl alcohol copolymer having an ethylene content of about 30 mole % was supplied into the sub-extruder A for formation of an intermediate layer, and a copolyester type adhesive was supplied into the subextruder B for formation of adhesive layers, and by using a pipe-forming apparatus of the external water cooling type, the resins were co-extruded into a multi-layer pipe having an outer diameter of 30 mm, an inner diameter of 23 mm and a thickness of 3.6 mm while cooling the inner portion of the pipe by a nitrogen stream. In this multi-layer pipe, the outer layer/adhesive layer/intermediate layer/adhesive layer/inner layer thickness ratio was 15/0.5/2/0.5/5. The pipe was cut into a size of 146 mm. Each cut pipe had a weight of 59 g. One end of the pipe was fusion-closed and the other end was formed into a neck portion having a screw. The so-obtained preform was heated at about 98° C. and drawn in the axial direction and the transverse direction substantially simultaneously to obtain a multi-layer drawn bottle having a capacity of about 1.5 l. The haze of the barrel portion of the bottle was 8% and the bottle had a very excellent transparency.

EXAMPLE 3

By using the same apparatus and materials as used in Example 2, a multi-layer pipe and a multi-layer drawn bottle, which had the same sizes and thicknesses as those of the pipe and bottle prepared in Example 2, where formed in the same manner as described in Example 2 except that the outer layer/adhesive layer/intermediate layer/adhesive layer/inner layer thickness ratio was changed to 7/0.5/2/0.5/13. The haze of the barrel portion of the bottle was 25%.

EXAMPLE 4

By using the same apparatus and materials as used in Example 2, a multi-layer pipe and a multi-layer drawn bottle, which had the same sizes and thicknesses as those of the pipe and bottle prepared in Example 2, were formed in the same manner as described in Example 2 except that the outer layer/adhesive layer/intermediate layer/adhesive layer/inner layer thickness ratio was changed to 10/0.5/2/0.5/10. The haze of the barrel portion of the bottle was 15%.

We claim:

1. A process for the production of a multi-layer pipe to be used for formation of a bottle by draw-blow-forming, which comprises forming by co-extrusion a pipe comprising inner and outer layers of polyester composed mainly of ethylene terephtahalate units and an intermediate layer of oxygen-barrier resin interposed between the inner and outer layers, if necessary with an adhesive resin layer interposed between every two adjacent layers, sizing the co-extruded multi-layer pipe in the molten state so that the diameter of the pipe is uniform, and cooling the outer portion of the molten multi-layer pipe by contact with water and simultaneously introducing an inert gas containing a water mist into the interior of the pipe to thereby cool the inner portion of the pipe and prevent oxidation in the pipe without crystallization, thereby forming a solidified pipe wherein both of the outer portion and the inner portion thereof are maintained in an amorphous state.

2. A process according to claim 1, wherein the coextrusion is carried out so that the thickness ratio of the inner polyester layer to the outer polyester layer is within a range of from 1/1.1 to 1/5.

3. A process according to claim 1, wherein the oxygen-barrier resin is in ethylene/vinyl alcohol copolymer.

4. A process according to claim 3, wherein the ethylene/vinyl alcohol copolymer is one having an ethylene content of 15 to 50 mole % and a saponification degree of at least 96%.

5. A process according to claim 1, wherein the inert gas is a nitrogen gas.

6. A process according to claim 1, wherein the thickness ratio of the polyester layer to the oxygen-barrier resin layer is within a range of from 2/1 to 30/1.

7. A process for the preparation of a multi-layer polyester vessel which comprises forming by co-extrusion of pipe comprising inner and outer layers of a polyester composed mainly of ethylene terephtahalate units and an intermediate layer of an oxygen-barrier resin interposed between the inner and outer layers, if necessary with an adhesive resin layer interposed between every two adjacent layers, sizing the co-extruded multi-layer pipe in the molten state so that the diameter of the pipe is uniform, cooling the outer portion of the molten multi-layer pipe by contact with water and simultaneously introducing an inert gas containing a water mist into the interior of the pipe to thereby cool the inner portion of the pipe and prevent oxidation in the pipe without crystallization, thereby forming a solidified pipe wherein both of the outer portion and the inner portion thereof are maintained in an amorphous state, cutting the solidified pipe into a predetermined size, forming a closed bottom on one end of the cut pipe and a portion to be engaged with a lid member on the other end of the cut pipe, preliminarily heating the so-formed preform at a drawing temperature of 85° to 120° C., and stretching and drawing the preliminarily heated bottomed preform in the axial direction and simultaneously expanding and drawing the preform in the circumferential direction by blowing of a fluid.

* * * * *